Patented Jan. 17, 1933

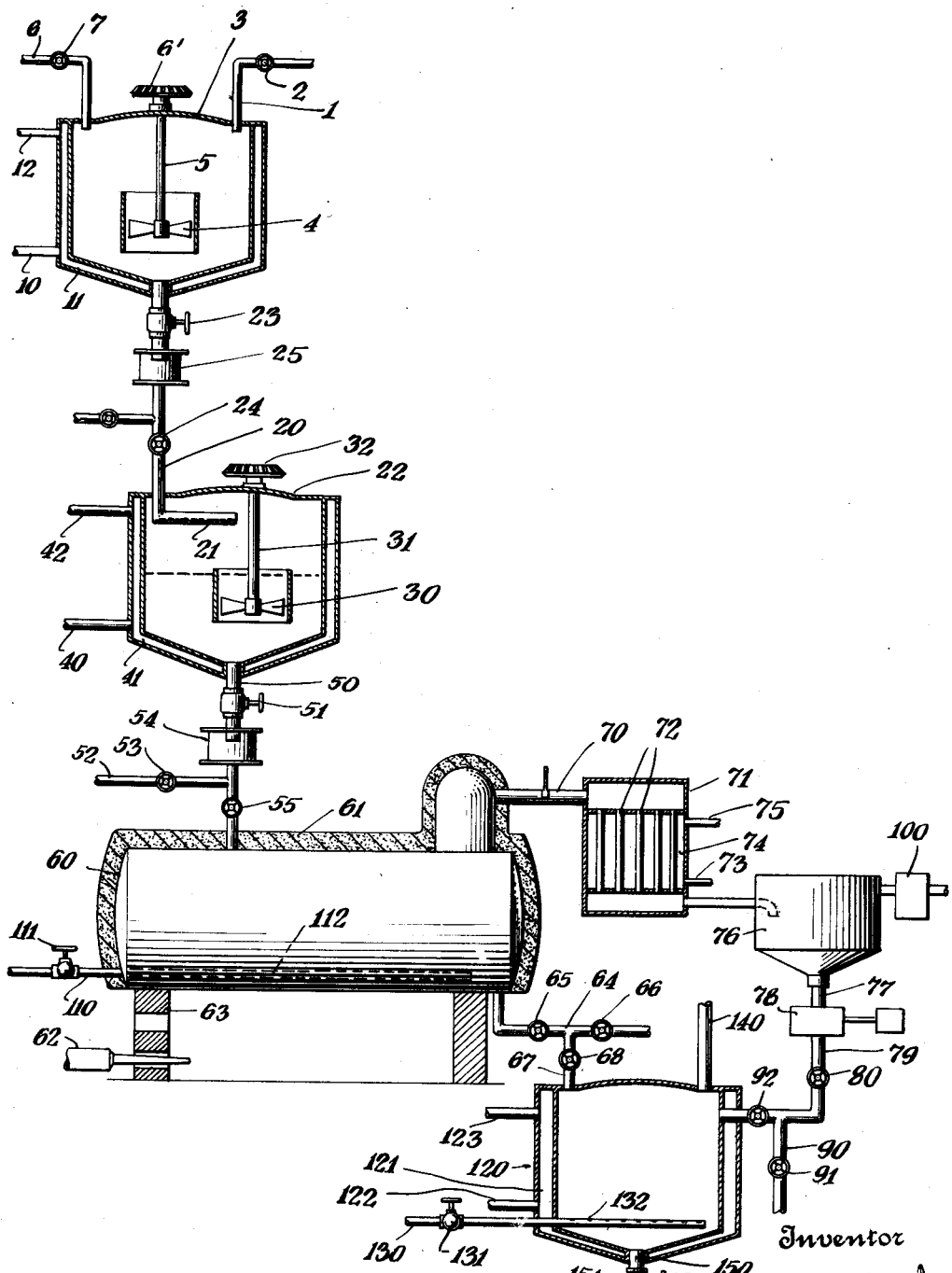

1,894,661

UNITED STATES PATENT OFFICE

BENJAMIN T. BROOKS, OF STAMFORD, CONNECTICUT, ASSIGNOR TO PETROLEUM CHEMICAL CORPORATION, A CORPORATION OF DELAWARE

PROCESS FOR GENERATING USEFUL PRODUCTS FROM HYDROCARBON MIXTURES CONTAINING OLEFINES

Application filed March 5, 1930. Serial No. 433,327.

The invention will be fully understood from the following description read in conjunction with the drawing which is a diagrammatic elevation principally in section of apparatus in which my invention may be carried into effect.

The starting material for my process is the normally gaseous mixture of hydrocarbons generated by cracking petroleum oils. Such mixtures to be useful in my process must contain both mono and diolefines, and I preferably utilize mixtures consisting predominantly of olefines generated by relatively extensive cracking. A preferred raw material for this purpose is the normally gaseous constituents resulting from vapor phase cracking of petroleum oils carried out, for example, at temperatures between 1000 and 1200° F. Such a gaseous mixture is treated preferably by fractionation to separate therefrom a fraction, the olefine content of which consists predominantly of mono and diolefines of 4 carbon atoms to the molecule. I include both secondary and tertiary olefines within the term "mono olefines" as herein employed. An example of such a raw material contains approximately the following percentages of the constituents enumerated:

| | Per cent |
|---|---|
| Erythrene | 15–20 |
| Isobutene | 15–30 |
| Normal butene | 45–65 |

After generating the described raw material, the next step consists in treating this raw material with aqueous sulphuric acid preferably from 60 to 80%, $H_2SO_4$ content. I prefer to employ for this purpose sulphuric acid of from 70 to 80%, $H_2SO_4$ content, and the temperature is preferably maintained during the treatment between 70 and 80° F. The treatment is preferably carried out with the hydrocarbon material in liquid phase, and further is preferably carried out by gradually adding the hydrocarbon material to a preformed pool of sulphuric acid of the desired concentration. In carrying out the reaction in this manner, the sulphuric acid is first charged to the containing vessel and the hydrocarbon material is then added in liquid phase in relatively small quantities with vigorous agitation. During the reaction, part of the butene is sulphated, and I find it desirable to have sufficient sulphuric acid present to react with at least 25% of the total mono olefine present, preferably, however, sufficient sulphuric acid is present to at least react with all of the mono olefines present after deducting therefrom a molecular equivalent of mono olefine for each molecular equivalent of diolefine present.

I find that by this manipulation an olefine material is produced consisting of polymerized olefines resulting from the joint polymerization of mono and diolefines of 4 carbon atoms and consisting of mixed polymers of butene and butadiene. Such polymerized materials frequently contain substantially molecular proportions of butene and butadiene and possess certain very exceptional qualities. The term "butene" will be hereinafter employed to denote either a pure secondary or tertiary butene, or a mixture of secondary and tertiary butenes in any proportions.

At the conclusion of the treatment the mono butene which has been converted into mono butyl sulphate by reaction with the sulphuric acid is present in solution in the sulphuric acid phase and there is invariably present hydrocarbon material which is not in solution in the sulphuric acid phase and may be found either as a separate and distinct layer, or else wholly or partly, suspended or dispersed, in the sulphuric acid phase. This hydrocarbon material may be separated by any appropriate means such as settling or centrifuging, although I preferably dilute the sulphuric acid with water and then settle to recover the hydrocarbon material. The hydrocarbon material may then be fractionated to separate any unreacted hydrocarbon therefrom leaving a residue of polymers of the type described. Such polymers may be utilized, per se, in a variety of ways having exceptional properties as solvents, drying oils, etc.; but my preferred procedure consists in separating therefrom the lighter polymers boiling up to 200° C. Such polymers boiling up to about 200° C. are highly exceptional as a motor fuel having antidetonation properties in exceptional degree. In contrast to benzol and similar materials the polymers boiling up to 200° C. have an extended range of boiling points and constitute therefore a complete motor fuel for service under exceptional conditions such as, for example, in extremely high compression, internal combustion engines for aviation use, etc. Also in contrast to materials such as benzol, the polymers so prepared boiling up to about 200° C. do not freeze to a solid at 0° C., but have a relatively low freezing point and are adapted to use at relatively low temperatures. The polymer material boiling above 200° C. may now be utilized as such for a variety of ways as, for example, in flotation oils, for bonding foundry cores, and as a plasticizer in film forming materials such as lacquers. This material may also be converted into drying oils by partial oxidation, and I preferably accomplish this purpose by blowing said polymer material boiling above 200° C. with air at temperatures in excess of 100° C. This partial oxidation is assisted by admixing with the polymer to be oxidized a relatively small quantity of drier. The term "drier" denotes a substance selected from those materials which I have generally found efficacious in promoting the oxidation of drying oils such as linseed oil.

In my preferred practice, the polymer material boiling above 200° C. is subjected to vacuum distillation and resolved into an overhead distillate and a residue. The overhead distillate is a yellow oil of highly improved appearance and exceptional drying characteristics. The residue is more highly viscous and while it dries more slowly, does not become brittle. It is particularly suited to plasticizing or rendering resinous materials smoother and more ductile, and may also be used for bonding foundry cores. Both the overhead distillate and the bottoms may be partially oxidized by blowing and thereby fitted for use in paints, etc.; although I prefer for this purpose the overhead distillate from the vacuum distillation owing to its better appearance and lower viscosity.

The invention will be illustrated by a single practical example. A quantity of sulphuric acid of about 75%, $H_2SO_4$ content, is charged through pipe 1, controlled by valve 2, to the autoclave 3. The amount of sulphuric acid may, for example, be sufficient to occupy 25% of the available volume of autoclave 3. The mixing device consisting of propeller 4, rotated by shaft 5, through bevel gear 6' by suitable means is then set in operation, and there is gradually added to autoclave 3 a quantity of hydrocarbon material having a composition within the range of the typical analysis hereinabove given. This material is introduced through pipe 6, controlled by valve 7 as a relatively small continuous stream.

It is also possible to preliminarily remove the isobutene from the raw olefine material prior to the specified acid treatment, and I find this to have advantages inasmuch as it permits me, by selectively removing the isobutene, to convert the same into tertiary butyl alcohol. This is not, however, essential and the process may be successfully conducted without such preliminary removal of isobutene. During the time that the olefine material is run into autoclave 3 a suitable refrigerant is passed in through pipe 10, to jacket 11 preferably in liquid form, and returns through pipe 12 to refrigerating apparatus. The quantity of refrigerant is preferably so regulated as to hold the temperature of the reacting materials between 70 and 80° F., although other temperatures may be employed, for example, between 60 and 100° F.; although even these limits are not exclusive and other temperatures may be maintained within the purview of my invention.

After concluding the addition of hydrocarbon material the mixture is preferably agitated for a time, for example, at least one half hour. While I may effect stratification by settling in autoclave 3, I preferably discharge the entire contents of this agitator through pipe 20 and distributor 21 into autoclave 22. Pipe 20 is controlled by valves 23 and 24, and flow through pipe 20 may be noted by means of observation box 25. Autoclave 22 is preliminarily charged with water, preferably equal roughly to at least two volumes of water for each volume of aqueous sulphuric acid previously added to autoclave 3. During the time that the mixture from autoclave 3 is run into autoclave 22, the mixing device comprising propeller 30, rotated by shaft 31, through bevel gear 32, is kept in operation. The temperature in 22 is preferably controlled by introducing a suitable refrigerant or cooling medium through pipe 40 to jacket 41. Return of the refrigerant or cooling medium to refrigerating apparatus is effected through pipe 42. The temperature in 22 during this operation is preferably held below 70° F. When all the material from autoclave 3 has been passed into autoclave 22 the mixing is stopped and the material in 22 permitted to settle. Stratification takes place and after settling for a time, say about one hour, the lower layer containing sulphuric acid, alkyl sulphate, and/or alcohol, may be withdrawn through pipe 50, controlled by valve 51 and side outlet 52, controlled by valve 53, to be worked up for alcohols or otherwise utilized. When all the lower layer has been withdrawn as shown by observations at observation box 54, the valve 53 is closed and the supernatant hydrocarbon material is diverted into still 60 by opening valve 55. Still 60 may be of any suitable form, it is preferably surrounded by suitable insulation material diagrammatically indicated by 61. The still may be heated by means of burner 62, and for that purpose is preferably carried by a fire-brick setting such as indicated by 63.

I find it desirable to add to the polymer at this stage a few per cent, say four to five, of a base which may be inorganic such as caustic but is preferably an oil soluble base forming a sulphate stable at temperatures up to about 200° C. The alkyl amines generally may be employed although I preferably add aniline. The polymer material is first partially distilled in 60 taking off overhead any unreacted hydrocarbon material. Such hydrocarbons belong to the C4 series, and are relatively low boiling. They pass off overhead through the vapor line 70 into condenser 71 in which they pass downwardly through tubes 72. Such hydrocarbons may either be conducted through the system to a gasometer, or may be condensed in pipes 72 by introducing a suitable refrigerant through pipe 73 to the space 74 surrounding the tubes 72. Vaporized refrigerant may pass off through pipe 75. The condensed hydrocarbon material accumulates in the run down pan 76 from which it may be transferred through pipe 77, by means of pump 78 and pipe 79, controlled by valve 80 to point of storage or utilization. It may for this purpose be diverted from the system by pipe 90, controlled by valve 91. Further heat is then applied to still 60 and a small quantity of steam may be introduced through pipe 110, controlled by valve 111, connected to distributor 112. The still is then operated until polymer material boiling up to about 200° C. has been removed, and this material is diverted from the system through pipe 90, controlled by valve 91 for use as fuel for internal combustion engines, or as a component of gasolene for anti-knock purposes, or to be worked up for solvents, etc. Vacuum is then applied to the system by operation of vacuum pump diagrammatically indicated by 100, and a part of the polymer material in still 60 is taken overhead and condensed in 71. During this stage, I prefer a vacuum of from zero to five pounds absolute. The amount of material taken overhead will, of course, depend upon the desired color and viscosity of the product, and this is in turn upon the specific use to which it is to be put. By way of example, the gasolene cut, viz, the material boiling up to 200° C., may constitute about 25% of the total polymer material and the overhead cut may be taken overhead to a bottoms of about 25%. This overhead material may be diverted through pump 78 and pipe 79 by opening valves 80 and 92 and so transferred to the cooker 120. This cooker may be heated, for example, by circulating the hot oil through jacket 121 by means of pipes 122 and 123 or by means of high pressure or superheated steam, and air may be dispersed into the liquid material in 120, through pipe 130, controlled by valve 131, connected to distributor 132. A small proportion of a drier, viz, a material or materials selected from the general class of paint driers or mineral oxides of oxidizing characteristics may be added to the materials in cooker 120. Gases evolved pass off through vent pipe 140. This operation is continued until the desired characteristics of the oil have been attained, and inasmuch as the mode of treatment varies with the physical characteristics desired, the type of film required, etc.; this treatment cannot be more specifically defined. At the expiration of the treatment the materials in 120 may be withdrawn through pipe 150, controlled by valve 151. The residue of polymer material remaining in still 60 may be either removed through pipe 64, controlled by valves 65 and 66, or may be diverted through pipe 67, controlled by valve 68 into cooker 120 to be processed by air blowing, etc.; and so partially oxidized for various utilizations.

The foregoing specific illustration is by way of example and inasmuch as the invention is susceptible of various embodiments and forms other than those specifically illustrated, it is my intention that the invention be limited only by the appended claims or their equivalents in which I have endeavored to claim broadly all inherent novelty.

I claim:

1. Process of generating useful products from a mixture of hydrocarbons containing mono and diolefines, which comprises separating from said mixture a fraction, the olefine content of which fraction consists predominantly of butadiene and butene, treating said fraction in liquid phase with sulphuric acid of from 60 to 80%, $H_2SO_4$ content, separating hydrocarbons not in solution in said sulphuric acid, and recovering polymerized hydrocarbons from said separated hydrocarbons.

2. Process according to claim 1, conducted at a temperature between 70 and 80° F.

3. Process of generating useful products from a mixture of hydrocarbons containing mono and diolefines, which comprises separating a fraction, the olefine content of which consists predominantly of butadiene and butene, treating said fraction in liquid phase with sulphuric acid of from 70 to 80%, $H_2SO_4$ content, separating hydrocarbons not in solution in said sulphuric acid, and recovering polymerized hydrocarbons from said separated hydrocarbons.

4. Process according to claim 3, carried out at a temperature between 70 and 80° F.

5. Process of generating useful products from a mixture of hydrocarbons consisting predominantly of mono and diolefines, which comprises separating therefrom a fraction consisting predominantly of butadiene and butene, treating said fraction in liquid phase with sulphuric acid of from 60 to 80%, $H_2SO_4$ content, separating hydrocarbons not in solution in said sulphuric acid, and recovering polymerized hydrocarbons from said separated hydrocarbons.

6. Process according to claim 5, carried out at a temperature between 70 and 80° F.

7. Process of generating useful products from a mixture of hydrocarbons consisting predominantly of mono and diolefines, which comprises separating from said mixture a fraction consisting predominantly of butadiene and butene, treating said fraction in liquid phase with sulphuric acid of from 70 to 80%, $H_2SO_4$ content, separating hydrocarbons not in solution in said sulphuric acid, and recovering polymerized hydrocarbons from said separated hydrocarbons.

8. Process according to claim 7, carried out at a temperature between 70 and 80° F.

9. Process of generating useful products from a mixture of hydrocarbons containing mono and diolefines, which comprises separating a fraction, the olefine content of which consists predominantly of butadiene and butene, treating said fraction in liquid phase with sulphuric acid of from 60 to 80%, $H_2SO_4$ content, separating hydrocarbons not in solution in said sulphuric acid, recovering polymerized hydrocarbons from said separated hydrocarbons, and separating from said polymerized hydrocarbons components boiling below 200° C.

10. Process of generating useful products from a mixture of hydrocarbons consisting predominantly of mono and diolefines, which comprises separating from said mixture a fraction consisting predominantly of butadiene and butene, treating said fraction in liquid phase with sulphuric acid of from 60 to 80%, $H_2SO_4$ content, separating hydrocarbons not in solution in said sulphuric acid, recovering polymerized hydrocarbons from said separated hydrocarbons, and separating from said polymerized hydrocarbons components boiling below 200° C.

11. Process of generating useful products from a mixture of hydrocarbons containing mono and diolefines, which comprises separating a fraction, the olefine content of which consists predominantly of butadiene and butene, treating said fraction in liquid phase with sulphuric acid of from 60 to 80%, $H_2SO_4$ content, separating hydrocarbons not in solution in said sulphuric acid, recovering polymerized hydrocarbons from said separated hydrocarbons, separating from said polymerized hydrocarbons components boiling below 200° C., and distilling said polymerized hydrocarbons boiling above 200° C., thereby producing an overhead distillate and a residue.

BENJAMIN T. BROOKS.